(12) United States Patent
Matsuo

(10) Patent No.: US 6,278,551 B1
(45) Date of Patent: Aug. 21, 2001

(54) OPTICAL PICKUP CAPABLE OF OPTICALLY SENSING A DIRECTION OF A BEAM DEFLECTED BY A DEFLECTING DEVICE BASED ON A PARTIAL COMPONENT OF THE BEAM INCIDENT ON THE DEFLECTING DEVICE

(75) Inventor: Daisuke Matsuo, Kodaira (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/418,228

(22) Filed: Oct. 14, 1999

(30) Foreign Application Priority Data

Oct. 29, 1998 (JP) .................................... 10-308605
Nov. 11, 1998 (JP) .................................... 10-320523

(51) Int. Cl.$^7$ ............................. G02B 27/10; G02B 7/02; G11B 7/00
(52) U.S. Cl. .................. 359/618; 359/814; 369/44.14
(58) Field of Search ................................. 359/618, 629, 359/813, 814, 823, 824; 369/44.14, 120

(56) References Cited

U.S. PATENT DOCUMENTS 4,542,492 * 9/1985 Leterme et al. ....................... 369/46
4,689,481 * 8/1987 Ono .................................... 250/201

FOREIGN PATENT DOCUMENTS 5-28523   2/1993  (JP) .
5-174417  7/1993  (JP) .
5-334703  12/1993 (JP) .
6-318331  11/1994 (JP) .

* cited by examiner

Primary Examiner—Ricky Mack
(74) Attorney, Agent, or Firm—Frishauf, Holtz, Goodman, Langer & Chick, P.C.

(57) ABSTRACT

An optical pickup comprises a light source section for emitting a parallel light beam, an optical head for converging the light beam onto a recording medium, and a deflecting device for deflecting the beam from the light source section toward the optical head. The deflecting device is capable of adjusting the direction of the deflected beam, so that the beam converged by the optical head onto the recording medium is moved for tracking control. The optical pickup further comprises partially directing means for partially directing the beam incident on the deflecting device in a direction different from the direction of the beam deflected toward the optical head so as to generate a partial light beam, and a sensor for optically sensing the direction of the beam deflected by the deflecting device on the basis of the partial light beam from the partially directing means. The deflecting device comprises a transparent optical element which, for example, allows most of the components of the incident beam to pass through and reflects the remaining few components, and a driving mechanism for rotating the optical element. The partially directing means comprises the optical element.

38 Claims, 5 Drawing Sheets

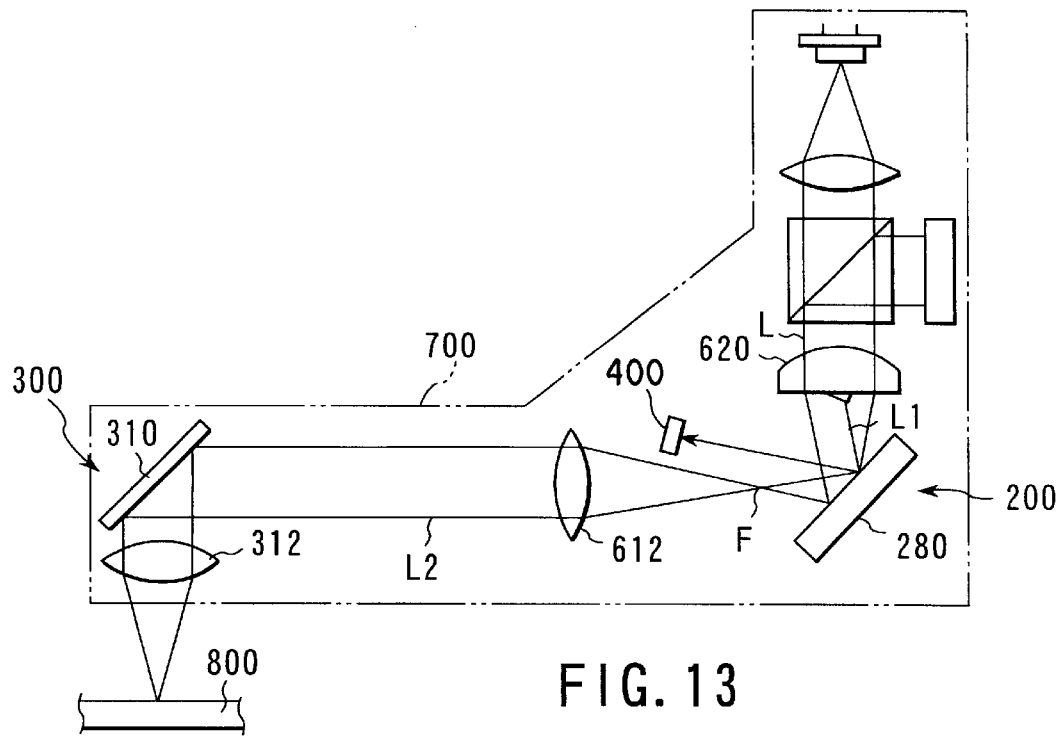
FIG. 13
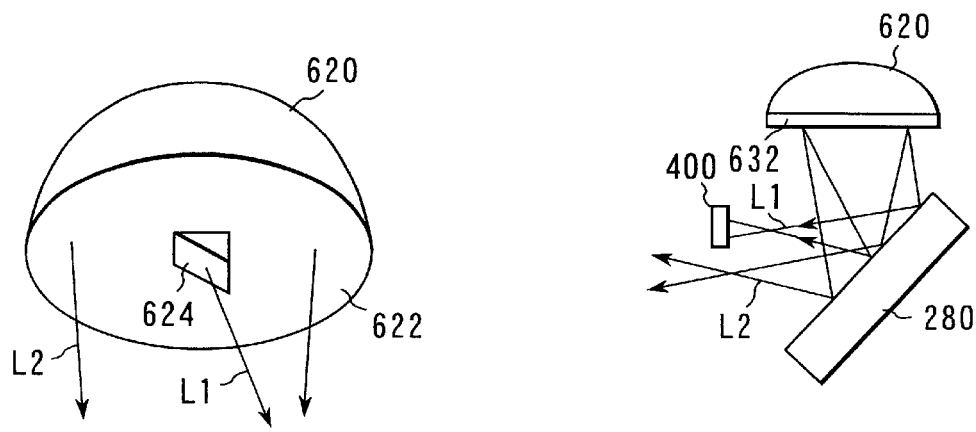
FIG. 14
FIG. 16
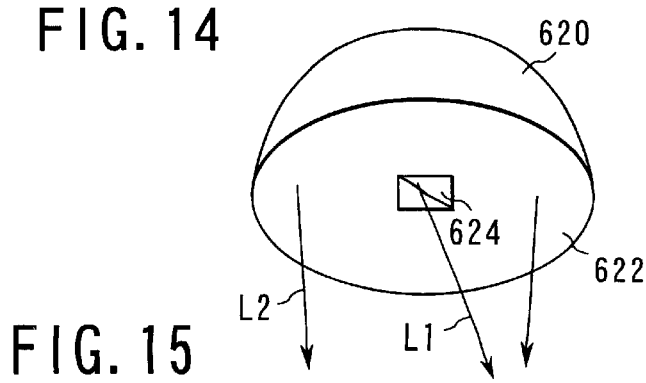
FIG. 15

OPTICAL PICKUP CAPABLE OF OPTICALLY SENSING A DIRECTION OF A BEAM DEFLECTED BY A DEFLECTING DEVICE BASED ON A PARTIAL COMPONENT OF THE BEAM INCIDENT ON THE DEFLECTING DEVICE

BACKGROUND OF THE INVENTION

The present invention relates to an optical pickup for optically recording or reproducing data onto or from a recording medium.

An optical pickup generally includes a deflecting device to provide fine tracking control for a recording medium in recording and reproducing information.

For example, Jpn. Pat. Appln. KOKAI Publication No. 6-318331 discloses an optical pickup using a galvanomirror as a deflecting device. The optical pickup measures the deviation between the optical axis of the optical system and the center of the light beam on the basis of the track deviation signal obtained when the galvanomirror is rotated. Then, on the basis of the deviation, the amount of correction is determined. Thereafter, the galvanomirror is rotated according to the amount of correction to eliminate the deviation of the optical axis, so that accurate tracking control is assured.

Since the optical pickup, however, dose not directly sense the rotation of the galvanomirror, once a rotation of the galvanomirror becomes too large to prevent the track error signal from being sensed, accurate tracking control will be difficult to perform.

Furthermore, Jpn. Pat. Appln. KOKAI Publication No. 5-174417 discloses the technique for directly sensing the rotation of the deflecting device by adding a beam splitter in the optical path of the optical system and directing part of the light beam to a position sensor via the beam splitter.

In this technique, however, the beam splitter has to be prepared additionally, which leads to not only a rise in the production cost but also an increase in the size and weight of the optical pickup.

Still furthermore, Jpn. Pat. Appln. KOKAI Publication No. 5-28523 discloses the following two techniques. One technique is to fix an additional light source to the mirror holder of the deflecting device and sense the light beam from the light source with an additional sensor to determine the inclination of the mirror. The other technique is to use the back of the mirror of the deflecting device as a reflecting surface, project a light beam from an additional light source onto the back of the mirror, and sense the light reflected from the back of the mirror with an additional sensor to determine the inclination of the mirror.

Jpn. Pat. Appln. KOKAI Publication No. 5-334703, which is similar to the above, discloses the technique for sensing the inclination of the mirror of the deflecting device by using a photoreflector into which a light-emitting element and a light-receiving element are integrated.

Because any one of the above techniques requires a light source or light-emitting element and a sensor or light-receiving element to be additionally prepared, this results not only in a rise in the production cost but also in an increase in the size and weight of the optical pickup.

BRIEF SUMMARY OF THE INVENTION

The present invention is directed to overcoming the disadvantages in the prior art. Therefore, a primary object of the present invention is to provide a low-cost, compact, lightweight optional pickup capable of directly sensing the rotation of the deflecting device with a simple configuration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 shows the configuration of an optical pickup according to a fourth embodiment of the present invention, wherein, for the sake of clarity, the optical axis of the optical head is drawn with bent at right angles, although it is actually perpendicular to the sheet of paper;

FIG. 14 is a perspective view of the optical element in the optical pickup shown in FIG. 13;

FIG. 15 shows another optical element applicable in place of the optical element shown in FIG. 14; and FIG. 16 shows still another optical element applicable in place of the optical element shown in FIG. 14.

DETAILED DESCRIPTION OF THE INVENTION

First Embodiment

Hereinafter, an optical pickup according to a first embodiment of the present invention will be explained by reference to FIG. 1.

Figure 1:
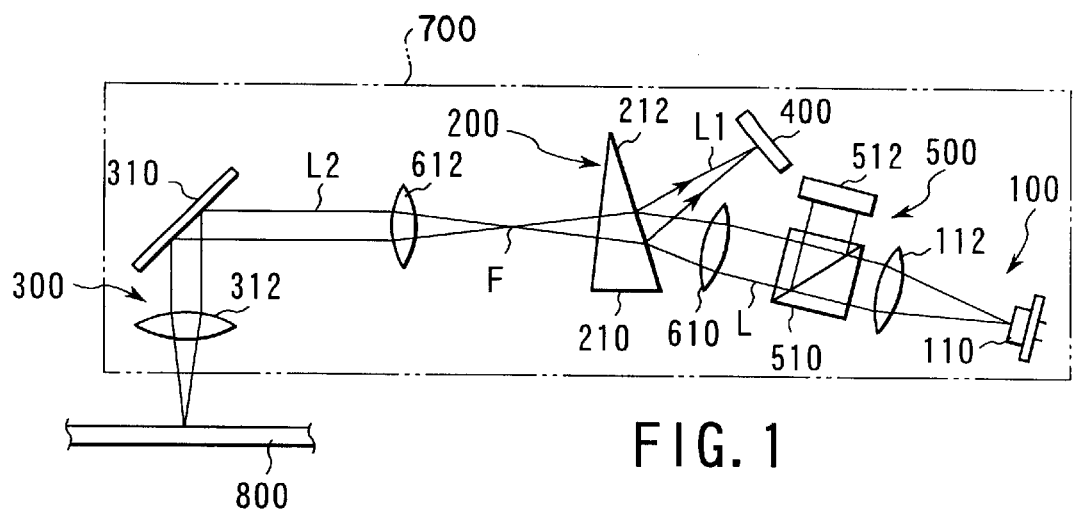
FIG. 1 shows the configuration of an optical pickup according to a first embodiment of the present invention, wherein, for the sake of clarity, the optical axis of the optical head is drawn with bent at right angles, although it is actually perpendicular to the sheet of paper.

As shown in FIG. 1, the optical pickup of the first embodiment comprises a light source section 100 for emitting a parallel light beam, an optical head 300 for converging the light beam onto a recording medium 800, and a deflecting device 200 for deflecting the beam L from the light source section 100 toward the optical head 300. The deflecting device 200 is positioned between the light source section 100 and optical head 300. The deflecting device 200 is capable of adjusting the direction of the deflected beam L2 so that the beam converged on the recording medium 800 by the optical head 300 may be moved for tracking control.

The light source section 100 includes, for example, the laser light source 100 and a collimate lens 112 for collimating the light emitted from the light source. The optical head 300 comprises a reflecting mirror 310 for deflecting the beam and an objective 312 for converging the beam.

The optical pickup further comprises partially directing means for directing part of the beam L incident on the deflecting device 200 in a direction different from the direction of the beam L2 deflected toward the optical head 300 so as to generate a partial light beam L1, and a sensor 400 for optically sensing the direction of the beam L2 deflected by the deflecting device 200 on the basis of the partial light beam L1 from the partially directing means.

The deflecting device 200 comprises, for example, a transparent optical element 210 for allowing most of the components of the incident beam L1 to pass through and reflecting the remaining few components and a driving mechanism for rotating the optical element 210. The optical element 210 also serves as the partially directing means. The driving mechanism will be explained later by reference to FIGS. 2 and 3.

The optical element 210 comprises a prism having, for example, a half mirror face 212. The half mirror face 212 preferably reflects 5% or less of the components of the incident beam L. For example, it reflects 3% of the components. The sensor 400 senses the direction (for example, of the normal) of the half mirror face 212 of the prism 210 on the basis of the beam L1 reflected by the half mirror face 212. In other words, it senses the direction of the deflected beam L2 which depends on the direction of the half mirror face 212.

The optical pickup further comprises a relay optical system. The relay optical system includes a pair of relay lenses 610 and 612 located in front of and behind the prism 210 of the deflecting device 200. The relay optical system has the function of moving the beam L2 moved by the deflecting device 200, in parallel with the optical axis. This enables the beam L2 to converge suitably on the recording medium 800 without eclipse by the pupil, therefore, without an unwanted fluctuation in the amount of light. The relay optical system may be omitted, depending on the design of the optical pickup.

The optical pickup further comprises a sensing system 500 for sensing the information on the basis of the returning light reflected from the recording medium 800 to reproduce the information recorded on the recording medium 800. The sensing system 500 comprises, for example, a beam splitter 510 for selectively reflecting the returning light and a sensing section 512 for sensing the light reflected by the splitter 510. Any configuration known in the art may be applied to the sensing system 500. In the case of a record-only optical pickup, the sensing system may be omitted.

The optical pickup further comprises an almost I-shaped housing 700. The housing 700 is, for example, swingably supported, such that the optical pickup employs a swing arm system. In the actual device, the axis of the swing is perpendicular to the sheet of paper. According to this, the optical axis of the optical head is also perpendicular to the sheet of paper. In FIG. 1, however, for visual understanding of the configuration of the optical pickup, the optical axis of the optical head is drawn in such a manner that it is bent at right angles.

The swing of the optical pickup allows the optical head 300 to traverse tracks on the recording medium 800, which enables the optical head 300 to access tracks in more distant positions in a shorter time.

The axis of the swing is preferably positioned near the deflecting device 200 having a relatively large weight. The positioning provides a relatively small inertial weight of the optical pickup, which improves the response of the optical pickup or helps the realization of high-speed accessing.

Figure 2:
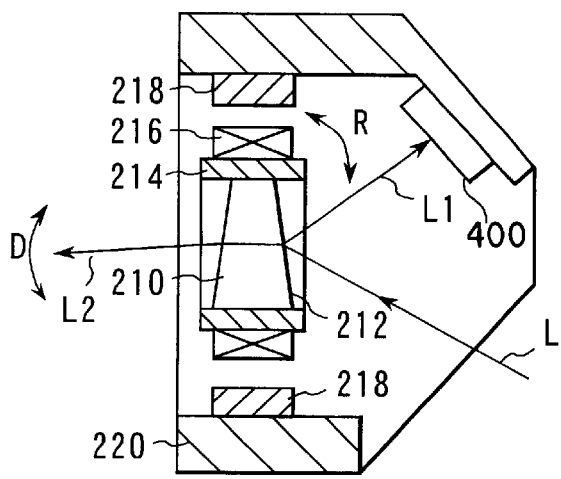
FIG. 2 is a vertical sectional view of a single unit including a deflecting device and a sensor in the optical pickup shown in FIG. 1.
Figure 3:
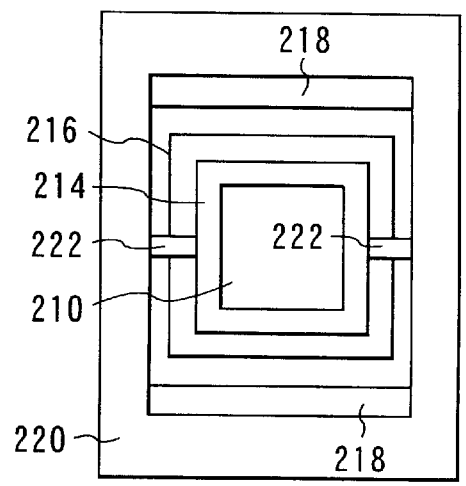
FIG. 3 is a front view of the single unit including the deflecting device and sensor in the optical pickup shown in FIG. 1.

The deflecting device 200 and the sensor 400 are included into a single unit. As shown in FIGS. 2 and 3, the unit further comprises a holder 214 for holding the prism 210, a fixed member 220 for supporting the holder 214 via an elastic member 222 so that the holder rotates, a driving coil 216 provided around the outer surface of the holder 214, and a permanent magnet 218 provided on the fixed member 220 so as to face the driving coil 216. These elements constitute the driving mechanism for rotating the prism 210. The sensor 400 is secured to the fixed member 220 as shown in FIG. 2.

With the driving mechanism, when current flows through the driving coil 216, this produces magnetic force between the driving coil 216 and permanent magnet 218, thereby rotating the holder 214 together with the prism 210 in the direction of arrow R. The direction and amount of rotation of the prism 210 depend on the direction and magnitude of the current that flows through the driving coil 216. As a result, the beam L2 passed through the prism 210 is deflected in the direction of arrow D in FIG. 2, depending on the direction and amount of rotation of the prism 210.

The beam L1 reflected by the half mirror face 212 of the prism 210 has an incident position on the sensor 400, which depends on the direction and amount of rotation of the prism 210. The sensor 400 senses the direction and amount of rotation of the half mirror face 212 of the prism 210 on the basis of the change of the incident position of the beam L1. As a result, the direction of the beam L2 is sensed.

Next, the operation of the optical pickup will be explained. The light beam L emitted from a laser light source 110 is converted into a parallel light beam by the collimate lens 112, then converted into a beam of convergent light by the first relay lens 610, and advances toward the prism 210. The beam L incident on the prism 210 is divided into two by the half mirror face 212. Most of the components of the incident beam L pass through the prism 210, whereas the remaining few components, for example, about 3% of all the components, are reflected by the half mirror face 212.

The beam L2 passed through the half mirror face 212 converges at a focal point F temporarily, then is converted into a parallel light beam by the second relay lens 612, reflected by the reflecting mirror 310 toward the objective 312. The objective 312 converges the beam on the recording medium 800.

The beam L1 reflected by the half mirror face 212 is directed to the sensor 400. The sensor 400 optically senses the direction and angle of rotation of the prism 210 on the basis of the beam L1. As a result, the direction of the beam L2 is sensed.

Moving the optical head 300 in parallel with the surface of the recording medium 800 provides rough tracking of the recording medium 800. Then, slight rotation of the prism 210 provides fine tracking control of the recording medium 800. Information is recorded or reproduced onto or from the recording medium 800 under the rough and fine tracking controls.

In reproduction, the returning light reflected from the recording medium 800 travels through the same optical path in the opposite direction and is directed by the beam splitter 510 toward the sensing section 512. The sensing section 512 senses a tracking error signal or an information reproducing signal on the basis of the incident light.

Because in the optical pickup, the prism 210 also serves as the partially directing means, the direction and angle of the rotation of the prism 210 can be sensed without changing the configuration of the optical pickup greatly. Furthermore, because in the optical pickup, the deflecting device 200 and sensor 400 are put in a single unit, the pickup can be constructed compact and light at low cost. Moreover, the compact optical pickup suppresses the unwanted inertial force or resonance of the swing arm system.

The present invention is not limited to the embodiment and various changes and modifications can be made without departing from the spirit and scope of the invention.

Figure 4:
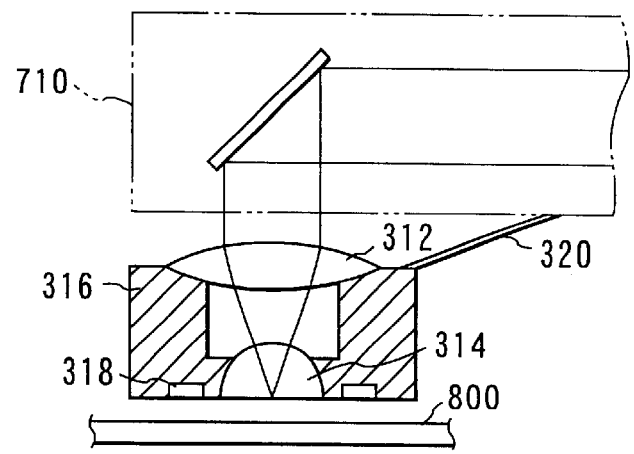
FIG. 4 shows the configuration of a near field recording/reproducing optical head applicable in place of the optical head shown in FIG. 1.

For instance, an optical head capable of near field recording and reproducing may be used as the optical head 300. This optical head, as shown in FIG. 4, further comprises a hemispherical SIL (Solid Immersion Lens) 314 in addition to the objective 312. The SIL 314 has the function of increasing NA and decreasing the spot diameter of the laser light finally formed.

Both the objective 312 and SIL 314 are held by the holder 316. The holder 316 is supported by a main housing 710 via an elastic member 320 capable of transforming elastically. The holder 316 is placed in contact with the recording medium 800 in a stationary state and floats about 10 to 100 nm above the recording medium 800 in the presence of an air flow caused by the rotation of the recording medium 800.

Recording and reproducing are effected by a magneto-optical system. The holder 316 has a magnetic field modulation coil 318 on its bottom surface. The recording medium 800 has a recording surface provided on the top surface of the substrate.

Near field recording and reproducing done by such an optical head requires no focus control. The spacing between the SIL 314 and the recording surface is automatically controlled by the floating of the holder 316 caused by the rotation of the recording medium 800. Since the spot diameter of the formed laser light is small as compared with a conventional optical head, the recording density is improved.

Second Embodiment

Figure 5:
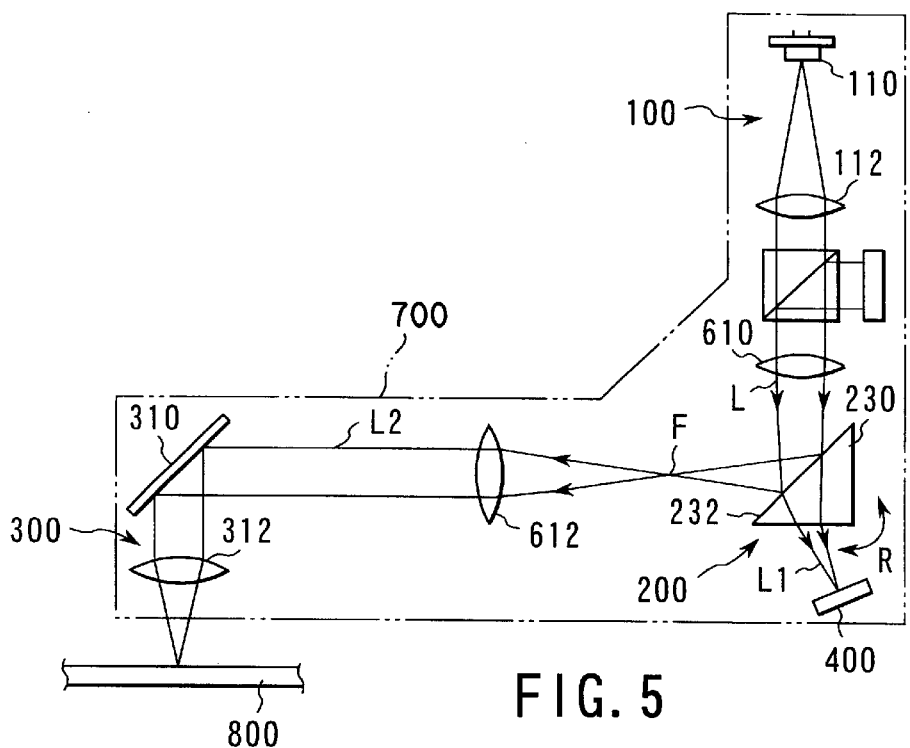
FIG. 5 shows the configuration of an optical pickup according to a second embodiment of the present invention, wherein, for the sake of clarity, the optical axis of the optical head is drawn with bent at right angles, although it is actually perpendicular to the sheet of paper.

Hereinafter, an optical pickup according to a second embodiment of the present invention will be explained by reference to FIG. 5. In FIG. 5, the same members as those in the first embodiment are indicated by the same reference numerals. A detail explanation of them will be omitted suitably in the description below.

As shown in FIG. 5, the optical pickup of the second embodiment comprises a light source section 100 for emitting a beam of parallel light, an optical head 300 for converging the light beam onto a recording medium 800, and a deflecting device 200 for deflecting the beam L from the light source section 100 toward the optical head 300. The deflecting device 200 is positioned between the light source section 100 and optical head 300. The deflecting device 200 is capable of adjusting the direction of the deflected beam L2 so that the beam converged on the recording medium 800 by the optical head 300 may be moved for tracking control.

The optical pickup further comprises partially directing means for directing part of the beam L incident on the deflecting device 200 in a direction different from the direction of the beam L2 deflected toward the optical head 300 so as to generate a partial light beam L1, and a sensor 400 for optically sensing the direction of the beam L2 deflected by the deflecting device 200 on the basis of the partial light beam L1 from the partially directing means.

The deflecting device 200 comprises, for example, a transparent optical element 230 for reflecting most of the components of the incident beam L and allowing the remaining few components to pass through and a driving mechanism for rotating the optical element 230. The optical element 230 also serves as the partially directing means. The optical element 230 comprises, for example, a prism with a half mirror face 232. The half mirror face 232 preferably allows 5% or less of the components of the incident beam L to pass through. For example, it allows 3% of all the components to pass through.

The optical pickup further comprises an almost L-shaped housing 700. The housing 700 is, for example, swingably supported, such that the optical pickup employs a swing arm system. In the actual device, the axis of the swing is perpendicular to the sheet of paper. Accordingly, the optical axis of the optical head is also perpendicular to the sheet of paper. In FIG. 5, however, to help visual understanding of the configuration of the optical pickup, the optical axis of the optical head is drawn in such a manner that it is bent at right angles.

The axis of the swing is preferably positioned near the deflecting device 200 having a relatively large weight. The positioning provides a relatively small inertial weight of the optical pickup, which improves the response of the optical pickup or helps the realization of high-speed accessing.

Figure 6:
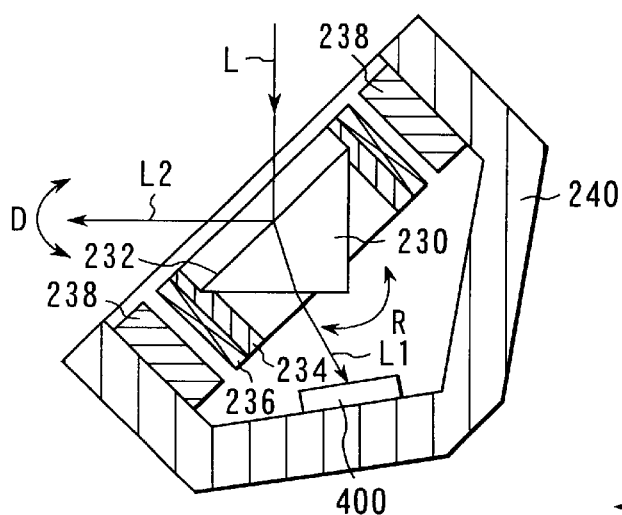
FIG. 6 is a vertical sectional view of a single unit including a deflecting device and a sensor in the optical pickup shown in FIG. 5.

The deflecting device 200 and the senso4 400 are included into a single unit. As shown in FIG. 6, the unit further comprises a holder 234 for holding the prism 230, a fixed member 240 for supporting the holder 234 via an elastic member so that the holder rotates, a driving coil 236 provided around the outer surface of the holder 234, and a permanent magnet 238 provided on the fixed member 240 so as to face the driving coil 236. These elements constitute the driving mechanism for rotating the prism 230. The sensor 400 is secured to the fixed member 240.

With the driving mechanism, when current flows through the driving coil 236, this produces magnetic force between the driving coil 236 and permanent magnet 238, thereby rotating the holder 234 together with the prism 230 in the direction of arrow R. The direction and amount of rotation of the prism 230 depend on the direction and magnitude of the current that flows through the driving coil 236. As a result, the beam L2 reflected by the half mirror face 232 of the prism 230 is deflected in the direction of arrow D, depending on the direction and amount of rotation of the prism 230.

The beam L1 passed through the prism 230 has an incident position on the sensor 400, which depends on the direction and amount of rotation of the prism 230. The sensor 400 senses the direction and amount of rotation of the half mirror face 232 of the prism 230 on the basis of the change of the incident position of the beam L1. As a result, the direction of the beam L2 is sensed.

Next, the operation of the optical pickup will be explained. The light beam L emitted from a laser light source 110 is converted into a parallel light beam by the collimate lens 112, then converted into a beam of convergent light by the first relay lens 610, and advances toward the prism 230. The beam L incident on the prism 230 is divided into two by the half mirror face 232. Most of the components of the incident beam L are reflected by the half mirror face 232, whereas the remaining few components, for example, about 3% of all the components, pass through the prism 230.

The beam L2 reflected by the half mirror face 232 converges at a focal point F temporarily, then is converted into a parallel light beam by the second relay lens 612, reflected by the reflecting mirror 310 toward the objective 312. The objective 312 converges the beam on the recording medium 800.

The beam L1 passed through the prism 230 advances toward the sensor 400. The sensor 400 optically senses the direction and angle of rotation of the prism 230 on the basis of the beam L1. As a result, the direction of the beam L2 is sensed.

Because in the optical pickup, the prism 230 also serves as the partially directing means, the direction and angle of the rotation of the prism 230 can be sensed without changing the configuration of the optical pickup greatly. Furthermore, because in the optical pickup, the deflecting device 200 and sensor 400 are put in a single unit, the pickup can be constructed compact and light at low cost. Moreover, the compact optical pickup suppresses the unwanted inertial force or resonance of the swing arm system.

The present invention is not limited to the above-mentioned embodiments and various changes and modifications can be made without departing from the spirit and scope of the invention.

Figure 7:
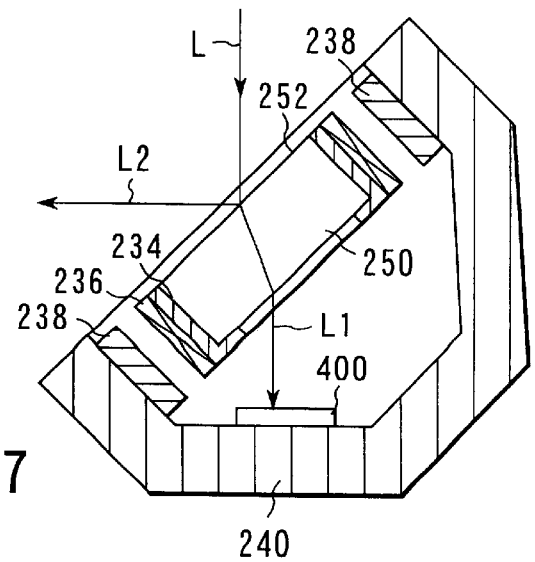
FIG. 7 is a vertical sectional view of a single unit including a deflecting device and a sensor related to a modification of the optical pickup shown in FIG. 5.

For instance, as shown in FIG. 7, a transparent parallel flat plate 250 with a half mirror face 252 may be applied to the optical element 230 of the deflecting device 200. The half mirror face 252 preferably allows 5% or less of the components of the incident beam L, for example, 3% of the components, to pass through, and reflects the remaining greater part of all the components. Since the flat plate is easier to process than a prism, the application of the flat plate 250 to the optical element 230 helps reduce the cost of the optical pickup more.

In addition, the near field recording/reproducing optical head shown in FIG. 4 may be used as the optical head 300 as in the first embodiment.

Third Embodiment

Figure 8:
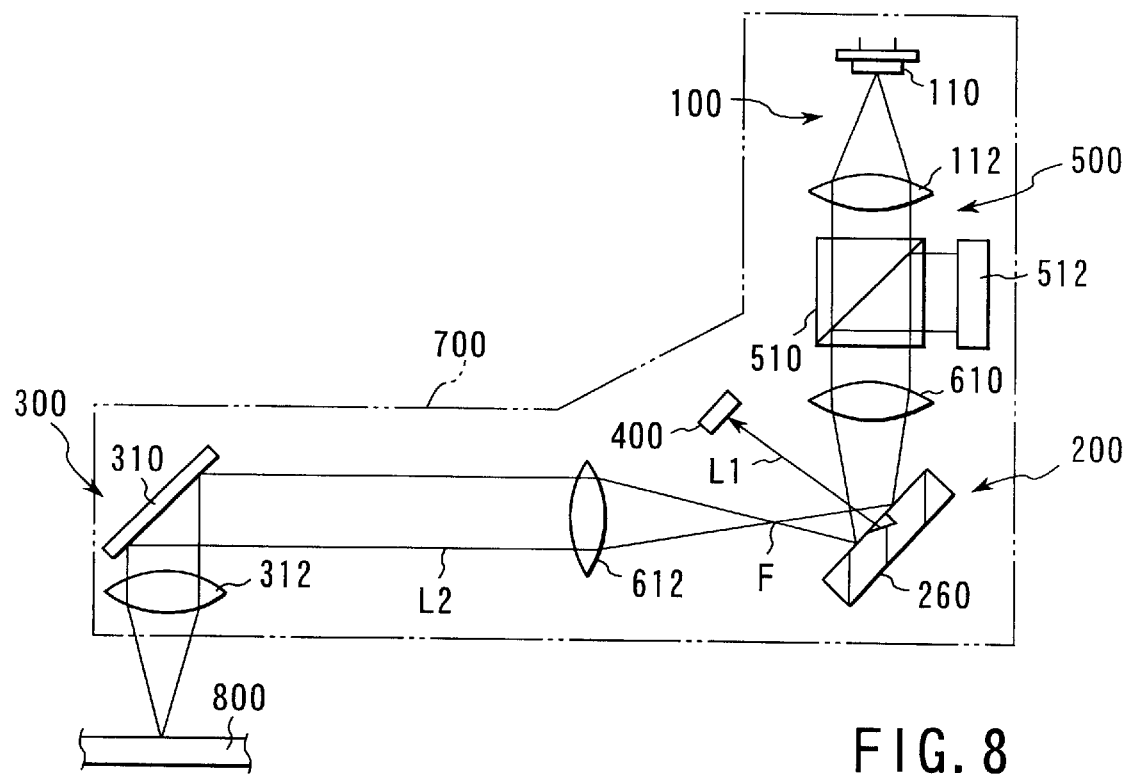
FIG. 8 shows the configuration of an optical pickup according to a third embodiment of the present invention, wherein, for the sake of clarity, the optical axis of the optical head is drawn with bent at right angles, although it is actually perpendicular to the sheet of paper.

Hereinafter, an optical pickup according to a third embodiment of the present invention will be explained by reference to FIG. 8. In FIG. 8, the same members as those in the first embodiment are indicated by the same reference numerals. A detail explanation of them will be omitted suitably in the description below.

As shown in FIG. 8, the optical pickup of the third embodiment comprises a light source section 100 for emitting a beam of parallel light, an optical head 300 for converging the light beam onto a recording medium 800, and a deflecting device 200 for deflecting the beam L from the light source section 100 toward the optical head 300. The deflecting device 200 is positioned between the light source section 100 and optical head 300. The deflecting device 200 is capable of adjusting the direction of the deflected beam L2 so that the beam converged on the recording medium 800 by the optical head 300 may be moved for tracking control.

The optical pickup further comprises partially directing means for directing part of the beam L incident on the deflecting device 200 in a direction different from the direction of the beam L2 deflected toward the optical head 300 so as to generate a partial light beam L1, and a sensor 400 for optically sensing the direction of the beam L2 deflected by the deflecting device 200 on the basis of the partial light beam L1 from the partially directing means.

The deflecting device 200 comprises, for example, a galvanomirror. The galvanomirror comprises an optical element 260 which reflects most of the components of the incident beam in a first direction and the remaining few components in a second direction. The optical element 260 also serves as partially directing means. The optical element 260, for example, has a mirror with a first reflecting face 262 and a second reflecting face 264. The first reflecting face 262 and second reflecting face 264 look in different directions. The first reflecting face 262 reflects most of the components of the incident beam in the first direction, whereas the second reflecting face 264 reflects the remaining few components in the second direction. The second reflecting face 264 preferably reflects 5% or less of the components of the incident beam L, for example, 3% of the components.

Figure 9:
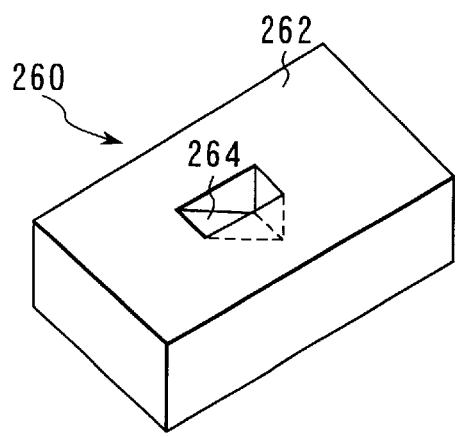
FIG. 9 is a perspective view of the optical element of the deflecting device in the optical pickup shown in FIG. 8.

Such a mirror 260 is formed by making a triangular-prism-shaped groove in one surface of the substrate by etching techniques. The surface provides the first reflecting face 262 and the bottom surface of the groove provides the second reflecting face 264. The position in which the groove is made, that is, the second reflecting face 264 is formed, may be set arbitrarily. Although in FIG. 9, the second reflecting face 264 is located in the center of the mirror 260, it may be placed in any position within the area which the incident beam strikes, or within the optically effective area.

The optical pickup further comprises an almost L-shaped housing 700. The housing 700 is, for example, swingably supported, such that the optical pickup employs a swing arm system. In the actual device, the axis of the swing is perpendicular to the sheet of paper. Accordingly, the optical axis of the optical head is also perpendicular to the sheet of paper. In FIG. 8, however, to help visual understanding of the configuration of the optical pickup, the optical axis of the optical head is drawn in such a manner that it is bent at right angles.

The axis of the swing is preferably positioned near the deflecting device 200 having a relatively large weight. The positioning provides a relatively small inertial weight of the optical pickup, which improves the response of the optical pickup or helps the realization of high-speed accessing.

Next, the operation of the optical pickup will be explained. The light beam L emitted from a laser light source 110 is converted into a parallel light beam by the collimate lens 112, then converted into a beam of convergent light by the first relay lens 610, and advances toward the mirror 260. The beam L incident on the mirror 260 is divided in two by the first reflecting face 262 and second reflecting face 264. Most of the components of the incident beam L are directed by the first reflecting face 262 toward the optical head 300, whereas the remaining few components, for example, about 3% of all the components, are directed by the second reflecting face 264 toward the sensor 400.

The beam L2 reflected by the first reflecting face 262 of the mirror 260 converges at a focal point F temporarily, then is converted into a parallel light beam by the second relay lens 612, reflected by the reflecting mirror 310 toward the objective 312. The objective 312 converges the beam on the recording medium 800.

The beam L1 reflected by the second reflecting face 264 of the mirror 260 advances toward the sensor 400. The position of the beam L1 incident on the sensor 400 depends on the direction and amount of the rotation of the mirror 260. The sensor 400 senses the direction and amount of the rotation of the mirror 260 on the basis of the beam L1. As a result, the direction of the beam L2 is sensed.

Because in the optical pickup, the mirror 260 also serves as the partially directing means, the direction and angle of the rotation of the mirror 260 can be sensed without changing the configuration of the optical pickup greatly. This further helps make the pickup compact and light at low cost. Moreover, the compact optical pickup suppresses the unwanted inertial force or resonance of the swing arm system.

The present invention is not limited to the above-mentioned embodiments and various changes and modifications can be made without departing from the spirit and scope of the invention.

Figure 10:
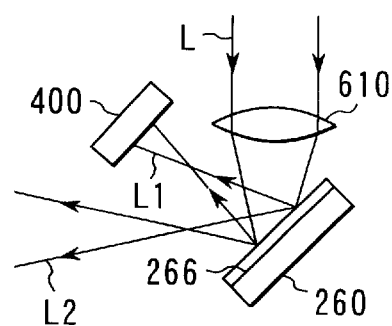
FIG. 10 shows another optical element applicable in place of the optical element shown in FIG. 9.

For instance, as shown in FIG. 10, an optical element with a grating section 266 may be applied to the mirror 260 of the deflecting device 200. The grating section 266 reflects not only most of the components of the incident beam toward the optical head 300 but also the remaining few components toward the sensor 400. The grating section 266 preferably directs 5% or less of the components of the incident beam L, for example, 3% of the components, toward the sensor 400, and the remaining greater part of all the components toward the optical head 300.

Furthermore, a near field recording/reproducing optical head shown in FIG. 4 may be applied to the optical head 300 as in the first embodiment.

Figure 11:
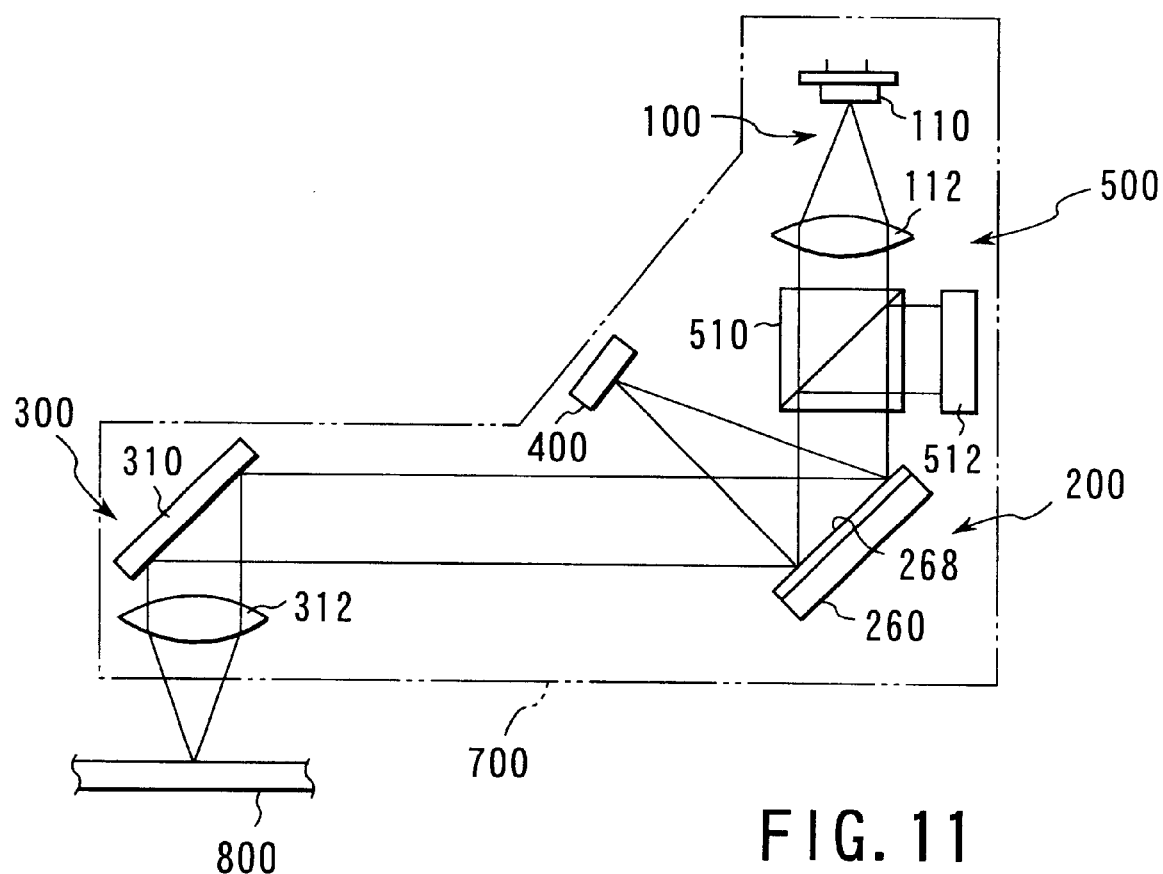
FIG. 11 shows the configuration of a modification of the optical pickup in the third embodiment, wherein, for the sake of clarity, the optical axis of the optical head is drawn with bent at right angles, although it is actually perpendicular to the sheet of paper.

FIG. 11 shows a modification of the optical pickup of the third embodiment.

As shown in FIG. 11, unlike the optical pickup of FIG. 8, the optical pickup of the modification includes no relay optical system. The mirror 260 of the deflecting device 200 comprises a grating section 268 which reflects not only most of the components of the incident beam toward the optical head 300 but also the remaining few components, preferably 5% or less of all the components, for example, 3% of all the components, to the sensor 400, and has the power of converging the beam L1 composed of the reflected components.

With the optical pickup of the modification, the deflecting device 200 can be positioned in the parallel light beam without preparing an additional optical element for converging the beam L1 advancing toward the sensor 400.

Figure 12:
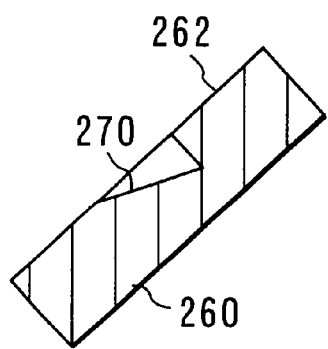
FIG. 12 shows another optical element applicable in place of the optical element of the deflecting device in the optical element shown in FIG. 11.

The optical element 260 may be replaced with, for example, a mirror which has a first reflecting face 262 for reflecting most of the components of the incident beam toward the optical head 300 and a second reflecting face 270 for not only reflecting the remaining few components toward the sensor 400 but also having the power of converging the beam L1 composed of the reflected components as shown in FIG. 12. The first reflecting face 262 has, for example, a flat surface and the second reflecting face 270 has, for example, part of a spherical surface.

Fourth Embodiment

Hereinafter, an optical pickup according to a fourth embodiment of the present invention will be explained by reference to FIG. 13. In FIG. 13, the same members as those in the first embodiment are indicated by the same reference numerals. A detail explanation of them will be omitted suitably in the description below.

As shown in FIG. 13, the optical pickup of the fourth embodiment comprises a light source section 100 for emitting a beam of parallel light, an optical head 300 for converging the light beam onto a recording medium 800, and a deflecting device 200 for deflecting the beam L from the light source section 100 toward the optical head 300. The deflecting device 200 is positioned between the light source section 100 and optical head 300. The deflecting device 200, which comprises, for example, a galvanomirror 280, is capable of adjusting the direction of the deflected beam L2 so that the beam converged on the recording medium 800 by the optical head 300 may be moved for tracking control.

The optical pickup further comprises partially directing means for directing part of the beam L incident on the deflecting device 200 in a direction different from the direction of the beam L2 deflected toward the optical head 300 so as to generate a partial light beam L1, and a sensor 400 for optically sensing the direction of the beam L2 deflected by the deflecting device 200 on the basis of the partial light beam L1 from the partially directing means.

The optical pickup further comprises a relay optical system. The relay optical system includes a pair of relay lenses 620 and 612 located in front of and behind the galvanomirror 280 of the deflecting device 200. The first relay lens 620 has the function of deflecting a few components of the incident beam and also serves as the partially directing means.

As shown in FIG. 14, the first relay lens 620 has a flat surface 622 occupying most of its bottom surface and an inclined surface 624 with respect to the flat surface 622. Most of the components of the incident beam pass through the flat surface 622. The remaining few components, preferably 5% or less of all the components, for example, 3% of all the components, are deflected by the inclined surface 624.

Next, the operation of the optical pickup will be explained. The light beam L emitted from a laser light source 110 is converted into a parallel light beam by the collimate lens 112. Thereafter, the beam is not only converted into a beam of convergent light by the first relay lens 620, but also divided into two by the flat surface 622 and inclined surface 624 of the first relay lens 620. Most of the components of the beam L pass through the flat surface 622 of the first relay lens 620 and are directed by the galvanomirror 280 toward the optical head 300. The remaining few components, preferably 5% or less of the components of the incident beam L, for example, 3% of the components, are deflected by the inclined surface 624 of the first relay lens 620 and then are directed by the galvanomirror 280 toward the sensor 400.

The beam L2 passed through the flat surface 622 of the first relay lens 620 converges at a focal point F temporarily, then is converted into a parallel light beam by the second relay lens 612, reflected by the reflecting mirror 310 toward the objective 312. The objective 312 converges the beam on the recording medium 800.

The beam L1 deflected by the inclined surface 624 of the first relay lens 620 is reflected by the galvanomirror 280 and advances toward the sensor 400. The beam L1 has an incident position on the sensor 400, which depends on the direction and amount of the rotation of the galvanomirror 280. The sensor 400 senses the direction and amount of rotation of the galvanomirror 280 on the basis of the change of the incident position of the beam L1. As a result, the direction of the beam L2 is sensed.

Because in the optical pickup, the relay lens 620 also serves as the partially directing means, the direction and angle of the rotation of the galvanomirror can be sensed without changing the configuration of the optical pickup greatly. This further helps make the pickup compact and light at low cost. Moreover, the compact optical pickup suppresses the unwanted inertial force or resonance of the swing arm system.

The present invention is not limited to the above-mentioned embodiments and various changes and modifications can be made without departing from the spirit and scope of the invention.

For instance, while the inclined surface 624 of the relay lens 620 is a slope given to a projection formed at the bottom surface of the lens, it may be a slope given to a depression formed at the bottom surface of the lens as shown in FIG. 15.

Furthermore, the relay lens 620 may be replaced with a lens including a grating section 632 which allows most of the components of the incident beam to pass through and deflects the remaining few components as shown in FIG. 16. The grating section 632 preferably deflects 5% or less of the components of the incident beam L, for example, 3% of the components. The grating section 632 may be formed integrally with the lens during the formation of the lens. Alternatively, it may be connected to the lens after it has been formed as a separate member.

The grating section 632 may be partially provided in the area which the incident beam strikes or in the optically effective area. It is preferable that the grating section 632 should be provided all over the bottom surface of the lens 620. This arrangement eliminates an effect on the subtle difference between the relay lens 620 and optical beam L, which keeps the components deflected by the grating section 632 constant.

Additionally, a near field recording/reproducing optical head shown in FIG. 4 may be used as the optical head 300 as in the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pickup for optically recording information onto and/or reproducing information from a recording medium, comprising:
    a light source section that emits a parallel light beam;
    an optical head that converges the beam onto the recording medium; and
    a deflecting device, located between the light source section and optical head, that deflects the beam from the light source section toward the optical head, said deflecting device being capable of adjusting a direction of the deflected beam so that the beam converged by the optical head onto the recording medium is moved for tracking control;
    wherein the deflecting device comprises a transparent optical element which:(i) allows most components of the beam from the light source to pass through so as to form the deflected beam, and (ii) reflects a remaining few components of the beam from the light source so as to generate a partial light beam in a direction different from the deflected beam;
    wherein a sensor optically senses the direction of the deflected beam based on the partial light beam; and
    wherein a driving mechanism is provided for rotating the optical element.

2. The optical pickup according to claim 1, wherein the optical element comprises a prism with a half mirror face and the sensor outputs a signal corresponding to a direction of the half mirror face.

3. The optical pickup according to claim 1, wherein the remaining few components are 5% or less of all the components.

4. The optical pickup according to claim 1, further comprising a relay optical system including a pair of relay lenses located in front of and behind the deflecting device.

5. The optical pickup according to claim 1, wherein the optical element, driving mechanism, and sensor are included in a single unit.

6. The optical pickup according to claim 1, wherein the optical head comprises an objective.

7. The optical pickup according to claim 1, wherein the optical head further comprises an SIL (Solid Immersion Lens) and the optical pickup enables near field recording and reproducing.

8. The optical pickup according to claim 1, further comprising a housing swingably supported about an axis, which provides a swing arm system for the optical pickup.

9. An optical pickup for optically-recording information onto and/or reproducing information from a recording medium, comprising:
    a light source section that emits a parallel light beam;
    an optical head that converges the beam onto the recording medium; and
    a deflecting device, located between the light source section and optical head, that deflects the beam from the light source section toward the optical head, said deflecting device being capable of adjusting a direction of the deflected beam so that the beam converged by the optical head onto the recording medium is moved for tracking control;
    wherein the deflecting device comprises a transparent optical element which: (i) reflects most components of the beam from the light source so as to form the deflected beam, and (ii) allows a remaining few components of the beam from the light source to pass through so as to generate a partial light beam in a direction different from the deflected beam;
    wherein a sensor optically senses the direction of the deflected beam based on the partial light beam; and
    wherein a driving mechanism is provided for rotating the optical element.

10. The optical pickup according to claim 9, wherein the optical element has a parallel flat plate with a half mirror face and the sensor outputs a signal corresponding to a direction of the half mirror face.

11. The optical pickup according to claim 9, wherein the remaining few components are 5% or less of all the components.

12. The optical pickup according to claim 9, further comprising a relay optical system with a pair of relay lenses located in front of and behind the deflecting device.

13. The optical pickup according to claim 9, wherein the optical element, driving mechanism, and sensor are included in a single unit.

14. The optical pickup according to claim 9, wherein the optical head comprises an objective.

15. The optical pickup according to claim 9, wherein the optical head further comprises an SIL (Solid Immersion Lens) and the optical pickup enables near field recording and reproducing.

16. The optical pickup according to claim 9, further comprising a housing swingably supported about an axis, which provides a swing arm system for the optional pickup.

17. The optical pickup according to claim 9, wherein the optical element comprises a prism with a half mirror face and the sensor outputs a signal corresponding to a direction of the half mirror face.

18. An optical pickup for optically recording information onto and/or reproducing information from a recording medium, comprising:

a light source section that emits a parallel light beam;

an optical head that converges the beam onto the recording medium; and a deflecting device, located between the light source section and optical head, that deflects the beam from the light source section toward the optical head, said deflecting device being capable of adjusting a direction of the deflected beam so that the beam converged by the optical head onto the recording medium is moved for tracking control;

wherein the deflecting device comprises an optical element which:(i) reflects most components of the beam from the light source in a first direction so as to form the deflected beam, and (ii) reflects a remaining few components of the beam from the light source in a second direction so as to generate a partial light beam in a direction different from the deflected beam;

wherein a sensor optically senses the direction of the deflected beam based on the partial light beam; and wherein a driving mechanism is provided for rotating the optical element.

19. The optical pickup according to claim 18, further comprising a housing swingably supported about an axis, which provides a swing arm system for the optical pickup.

20. The optical pickup according to claim 18, wherein said remaining few components are 5% or less of all the components.

21. The optical pickup according to claim 18, further comprising a relay optical system with a pair of relay lenses located in front of and behind the deflecting device.

22. The optical pickup according to claim 18, wherein the optical element, driving mechanism, and sensor are included in a single unit.

23. The optical pickup according to claim 18, wherein the optional head comprises an objective.

24. The optional pickup according to claim 18, wherein the optional head further comprises an SIL (Solid Immersion Lens) and the optional pickup enables near field recording and reproducing.

25. The optical pickup according to claim 18, wherein the optical element has a first reflecting face which reflects most of the components of the beam from the light source in the first direction and a second reflecting face which reflects the remaining few components of the beam from the light source in the second direction.

26. The optical pickup according to claim 25, wherein the second reflecting face converges the components reflected in the second direction.

27. The optical pickup according to claim 18, wherein the optical element comprises a grating section which reflects most of the components of the beam from the light source in the first direction and which also reflects the remaining few components of the beam from the light source in the second direction.

28. The optical pickup according to claim 27, wherein the grating section converges the components reflected in the second direction.

29. An optical pickup for optically recording information onto and/or reproducing information from a recording medium, comprising:

a light source section that emits a parallel light beam;

an optical head that converges the beam onto the recording medium; and a deflecting device, located between the light source section and optical head, that deflects the beam from the light source section toward the optical head, said deflecting device being capable of adjusting a direction of the deflected beam so that the beam converged by the optical head onto the recording medium is moved for tracking control;

wherein the deflecting device comprises a mirror and a driving mechanism that rotates the mirror;

wherein a transparent optical element is provided in front of the mirror to: (i) allow most components of the beam from the light source to pass through so as to form the deflected beam, and (ii) deflect a remaining few components of the beam from the light source so as to generate a partial light beam in a direction different from the deflected beam; and wherein a sensor optically senses the direction of the deflected beam based on the partial light beam.

30. The optical pickup according to claim 29, wherein said remaining few components are 5% or less of all the components.

31. The optical pickup according to claim 29, further comprising a relay optical system with a pair of relay lenses located in front of and behind the deflecting device.

32. The optical pickup according to claim 31, wherein the optical element has a positive optical power and also serves as the relay lens located in front of the deflecting device.

33. The optical pickup according to claim 29, wherein the optical element, driving mechanism, and sensor are included in a single unit.

34. The optical pickup according to claim 29, wherein the optical head comprises an objective.

35. The optional pickup according to claim 29, wherein the optional head further comprised an SIL (Solid Immersion Lens) and the optional pickup enables near field recording and reproducing.

36. The optical pickup according to claim 29, further comprising a housing swingably supported about an axis, which provides a swing arm system for the optical pickup.

37. The optical pickup according to claim 30, wherein the optical element comprises a first face which allows most of the components of the beam from the light source to pass through and a second face which allows the remaining few components of the beam from the light source to also pass through in a deflected manner, with the first face inclined at a specific angle to the second face.

38. The optical pickup according to claim 30, wherein the optical element comprises a grating section which allows most of the components of the beam from the light source to pass through and which deflects the remaining few components of the beam from the light source.

* * * * *

UNITED STATES PATENT AND TRADEMARK OFFICE
CERTIFICATE OF CORRECTION

PATENT NO. : 6,278,551 B1
DATED : August 21, 2001
INVENTOR(S) : Daisuke Matsuo

It is certified that error appears in the above-identified patent and that said Letters Patent is hereby corrected as shown below:

<u>Title page,</u>
Item [56], References Cited, FOREIGN PATENT DOCUMENTS, insert:
-- 0123456-A2   1/2000   (Europe) --.

Signed and Sealed this

Twenty-fourth Day of September, 2002

Attest:

Attesting Officer

JAMES E. ROGAN
*Director of the United States Patent and Trademark Office*